United States Patent
Umemoto et al.

(10) Patent No.: US 6,827,457 B2
(45) Date of Patent: Dec. 7, 2004

(54) LIGHT PIPE, PLANAR LIGHT SOURCE UNIT AND REFLECTIVE LIQUID-CRYSTAL DISPLAY DEVICE

(75) Inventors: Seiji Umemoto, Ibaraki (JP); Toshihiko Ariyoshi, Ibaraki (JP)

(73) Assignee: Nitto Denko Corporation, Osaka (JP)

(*) Notice: Subject to any disclaimer, the term of this patent is extended or adjusted under 35 U.S.C. 154(b) by 0 days.

(21) Appl. No.: 10/093,409

(22) Filed: Mar. 11, 2002

(65) Prior Publication Data

US 2002/0126468 A1 Sep. 12, 2002

(30) Foreign Application Priority Data

Mar. 12, 2001 (JP) ................................. P2001-068535

(51) Int. Cl.[7] .............................................. F21V 7/04
(52) U.S. Cl. ............................ 362/31; 362/26; 385/146
(58) Field of Search ....................... 362/26, 31; 385/146

(56) References Cited

U.S. PATENT DOCUMENTS

| | | | |
|---|---|---|---|
| 5,183,597 A | | 2/1993 | Lu |
| 5,339,179 A | * | 8/1994 | Rudisill et al. ............... 359/49 |
| 5,341,231 A | | 8/1994 | Yamamoto et al. |
| 5,390,276 A | | 2/1995 | Tai et al. |
| 5,485,291 A | | 1/1996 | Qiao et al. |
| 5,584,556 A | | 12/1996 | Yokoyama et al. |
| 5,671,994 A | | 9/1997 | Tai et al. |
| 5,712,694 A | | 1/1998 | Taira et al. |
| 5,727,107 A | | 3/1998 | Umemoto et al. |
| 5,808,713 A | | 9/1998 | Broer et al. |
| 5,897,184 A | | 4/1999 | Eichenlaub et al. |
| 5,945,209 A | | 8/1999 | Okazaki et al. |
| 5,961,198 A | | 10/1999 | Hira et al. |
| 6,044,196 A | | 3/2000 | Winston et al. |
| 6,060,183 A | | 5/2000 | Higashi et al. |
| 6,099,134 A | * | 8/2000 | Taniguchi et al. ............. 362/31 |

(List continued on next page.)

FOREIGN PATENT DOCUMENTS

| | | |
|---|---|---|
| EP | 867 747 A2 | 9/1998 |
| JP | 5-158033 | 6/1993 |
| JP | 9-297222 | 11/1997 |
| JP | 10-106328 | 4/1998 |
| JP | 331593 | 5/1998 |
| JP | 11-142618 | 5/1999 |
| JP | 2000-147499 | 5/2000 |
| TW | 338869 | 8/1998 |
| WO | WO 97/01610 | 1/1997 |
| WO | WO 97/30373 | 8/1997 |
| WO | WO 97-47467 | 12/1997 |

Primary Examiner—Thomas M. Sembir
Assistant Examiner—Jacob Y. Choi
(74) Attorney, Agent, or Firm—Sughrue Mion, PLLC

(57) ABSTRACT

A light pipe having a plate-like substance having an upper surface, a lower surface opposite to the upper surface, an incidence side surface, and an end surface opposite to the incidence side surface, the plate-like substance including a light output device formed in the upper surface so that light incident on the incidence side surface is made to exit from the lower surface through the light output device, the light output device being constituted by fine grooves arranged discontinuously so as to face the incidence side surface, each of the fine grooves having a length of not larger than 250 μm and a depth of not larger than 50 μm and not larger than ⅕ as large as the length, each of the fine grooves being constituted by a combination of an optical path changing slope inclined to the lower surface at an angle in a range of from 35 to 48 degrees and a steep slope facing the optical path changing slope and inclined to the lower surface at an angle of not lower than 60 degrees. A reflective liquid-crystal display device having a planar light source unit including a light pipe defined above, and a reflective liquid-crystal display panel disposed on the lower surface side of the light pipe.

11 Claims, 3 Drawing Sheets

U.S. PATENT DOCUMENTS

| | | | |
|---|---|---|---|
| 6,130,730 A * | 10/2000 | Jannson et al. ............... 349/65 |
| 6,147,732 A | 11/2000 | Aoyama et al. |
| 6,168,281 B1 * | 1/2001 | Suzuki ....................... 362/31 |
| 6,196,692 B1 | 3/2001 | Umemoto et al. |
| 6,199,995 B1 | 3/2001 | Umemoto et al. |
| 6,236,439 B1 | 5/2001 | Sakai et al. |
| 6,295,104 B1 * | 9/2001 | Egawa et al. ................. 349/63 |
| 6,322,236 B1 | 11/2001 | Campbell et al. |
| 6,334,689 B1 * | 1/2002 | Taniguchi et al. ............ 362/31 |
| 6,369,950 B1 | 4/2002 | Umemoto |
| 6,375,336 B1 * | 4/2002 | Suzuki et al. ................. 362/31 |
| 6,384,881 B1 | 5/2002 | Arai et al. |
| 6,454,452 B1 * | 9/2002 | Sasagawa et al. .......... 362/561 |
| 6,485,157 B2 * | 11/2002 | Ohkawa ...................... 362/31 |
| 6,490,401 B2 * | 12/2002 | Cornelissen et al. ........ 385/146 |
| 2001/0009474 A1 | 7/2001 | Umemoto et al. |
| 2001/0011779 A1 | 8/2001 | Stover |
| 2001/0012158 A1 | 8/2001 | Umemoto et al. |
| 2001/0012159 A1 | 8/2001 | Umemoto et al. |
| 2001/0053029 A1 | 12/2001 | Umemoto et al. |

\* cited by examiner

LIGHT PIPE, PLANAR LIGHT SOURCE UNIT AND REFLECTIVE LIQUID-CRYSTAL DISPLAY DEVICE

The present application is based on Japanese Patent Application No. 2001-068535, which is incorporated herein by reference.

BACKGROUND OF THE INVENTION

1. Field of the Invention

The present invention relates to a light pipe which can be used for a front light unit to form a reflective liquid-crystal display device free from disorder and moiré of a display image, bright and easy to view, and relates to a planar light source unit using the light pipe and excellent in effective light-utilizing efficiency.

2. Description of the Related Art

In the related art, there has been known a front light type reflective LCD (liquid-crystal display device) operative in a reflection-illumination double mode. In the reflective LCD, a side type light pipe having light output means constituted by prismatic structures shaped like stripes and formed in an upper surface of the light pipe at equal intervals is disposed on a visual side of a reflective liquid-crystal display panel, so that display can be viewed even in dark places. In the front light type reflective LCD, light incident on a side surface of the light pipe is made to exit from a back side (lower surface side) of the light pipe, and is reversed by use of a reflection layer. In such a manner, display light is viewed through the light pipe. Accordingly, the front light system has an advantage in that a total reflection type reflection layer can be used to enhance reflectance and in that a display image obtained by the reflective LCD can be therefore made brighter both in a refection mode and an illumination mode than that obtained by a semi-transmissive LCD using a backlight unit and a half-silvered mirror.

On the other hand, the light pipe for a front light unit has the following advantages in terms of viewing characteristic. First, luminance is excellent because light is made to exit from the lower surface of the light pipe efficiently with good vertical directivity. Second, light leakage from the upper surface of the light pipe is little though such light leakage disturbs viewing of a display image. Third, the light pipe used does not make the display image disordered. Fourth, the light pipe transmits external light efficiently. Fifth, existence of the light pipe is hardly conspicuous visually. The related-art light pipe, however, has the following problems. That is, viewing of a display image is disturbed because the striped prism structure is apt to be conspicuous visually and existence of the light pipe is accordingly easily noticed. In addition, display quality is largely lowered because the striped prism structure interferes with pixels of the liquid-crystal display panel and moiré is therefore generated. As a measure to prevent such moiré, there has been proposed a system in which the direction of arrangement of prisms is inclined to the direction of arrangement of pixels. In such a case, however, the effect in preventing moiré is poor if the inclination angle is too low. If the inclination angle is conversely too high, light transmitted through the light pipe is reflected horizontally on faces of the prisms. Accordingly, there arises also a problem that the exit angle is largely inclined to reduce illuminating efficiency and output efficiency.

On the other hand, a structure of spherical dots or sectionally cylindrical concave/convex pits has been known as the light output means provided in the light pipe. Light reflection using the spherical dots or sectionally cylindrical pits is, however, ineffective for illumination of a reflective LCD because light is diffused and made to exit from the light pipe at a high inclination angle to a direction normal to the lower surface of the light pipe to make vertical directivity poor. That is, because the reflection surface of the reflective LCD generally takes a normal distribution type reflection mode, reflectance increases as light is reflected more regularly on the reflection surface. Accordingly, if light made to exit from the lower surface of the light pipe is short of vertical directivity, the reflected light through the reflection surface can hardly illuminate the LCD effectively even in the case where efficiency in light emission from the lower surface is excellent. As a result, the reflected light hardly contributes to improvement in luminance of the LCD, so that display of the LCD is dark in the frontal direction. Generally, the direction that an observer views the LCD is a direction normal to the LCD, that is, a direction normal to the lower surface of the light pipe. Accordingly, light made to exit in the direction normal to the lower surface of the light pipe can illuminate the LCD most effectively.

Further, in the light pipe having a structure of semispherical dots or pits as described above, portions having inclination angles close to those of flat portions are formed continuously. In reflection of external light, light reflected through these portions having inclination angles close to those of the flat portions is apt to be caught into the observer's eyes as if the light were continued to light reflected through the flat portions. As a result, there arises a problem that the dots or pits are apt to be conspicuous visually and that existence of the light pipe is accordingly apt to be recognized visually.

SUMMARY OF THE INVENTION

An object of the invention is to develop a light pipe for a front light unit, which is visually inconspicuous both in an external light mode and in an illumination mode, substantially free from generation of moiré, and formed so that light incident on a side surface of the light pipe is made to exit from a lower surface of the light pipe efficiently with good vertical directivity to thereby make it possible to form a reflective LCD being bright in display and providing a display image hardly disordered.

According to the invention, there is provided a light pipe having a plate-like substance having an upper surface, a lower surface opposite to the upper surface, an incidence side surface, and an end surface opposite to the incidence side surface, the plate-like substance including light output means formed in the upper surface so that light incident on the incidence side surface is made to exit from the lower surface through the light output means, the light output means being constituted by fine grooves arranged discontinuously so as to face the incidence side surface, each of the fine grooves having a length of not larger than 250 $\mu$m and a depth of not larger than 50 $\mu$m and not larger than ⅕ as large as the length, each of the fine grooves being constituted by a combination of an optical path changing slope inclined to the lower surface at an angle in a range of from 35 to 48 degrees and a steep slope facing the optical path changing slope and inclined to the lower surface at an angle of not lower than 60 degrees.

According to the invention, there is provided a planar light source unit having a light pipe defined above, and a light source disposed on the incidence side surface of the light pipe.

According to the invention, there is provided a reflective liquid-crystal display device having a light pipe defined above, and a reflective liquid-crystal display panel disposed on the lower surface side of the light pipe.

According to the invention, there is provided a reflective liquid-crystal display device having a planar light source unit defined above, and a reflective liquid-crystal display panel disposed on the lower surface side of the light pipe in the planar light source unit.

According to the invention, it is possible to obtain a light pipe in which light incident on an incidence side surface of the light pipe is made to exit from a lower surface of the light pipe through optical path changing slopes efficiently with good vertical directivity. The light pipe can be used for obtaining a planar light source unit excellent in light-utilizing efficiency and excellent in frontal luminance. Because the light pipe includes light output means constituted by fine grooves arranged discontinuously, moiré owing to interference of the light output means with pixels arranged in a liquid-crystal display panel is hardly generated and existence of the light output means is visually inconspicuous both in an external light mode and in an illumination mode. In addition, the light pipe can transmit external light efficiently because light leakage from an upper surface of the light pipe is little. Accordingly, the light pipe can be provided as a front light type light pipe for forming a reflective LCD bright in display and providing a display image hardly disordered.

Features and advantages of the invention will be evident from the following detailed description of the preferred embodiments described in conjunction with the attached drawings.

DETAILED DESCRIPTION OF THE PREFERRED EMBODIMENTS

Figure 1:
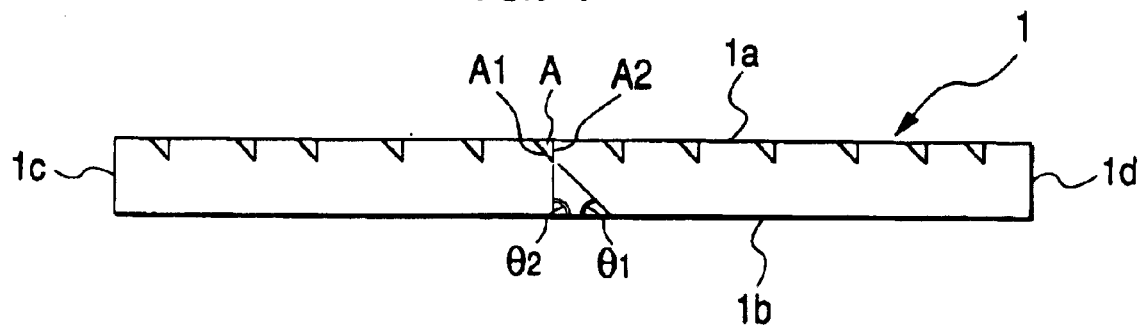
FIG. 1 is an explanatory side view of a light pipe.
Figure 2:
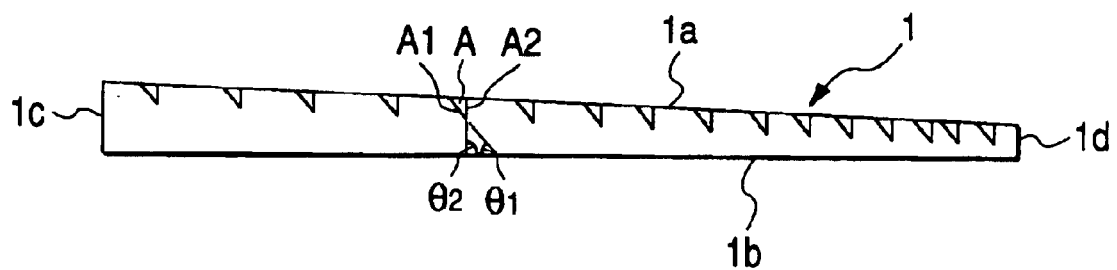
FIG. 2 is an explanatory side view of another light pipe.

The light pipe according to the invention has a plate-like substance having an upper surface, a lower surface opposite to the upper surface, an incidence side surface, and an end surface opposite to the incidence side surface, the plate-like substance including light output means formed in the upper surface so that light incident on the incidence side surface is made to exit from the lower surface through the light output means, the light output means being constituted by fine grooves arranged discontinuously so as to face the incidence side surface, each of the fine grooves having a length of not larger than 250 $\mu$m and a depth of not larger than 50 $\mu$m and not larger than 1/5 as large as the length, each of the fine grooves being constituted by a combination of an optical path changing slope inclined to the lower surface at an angle in a range of from 35 to 48 degrees and a steep slope facing the optical path changing slope and inclined to the lower surface at an angle of not lower than 60 degrees. FIGS. 1 and 2 show examples of the light pipe. As shown in FIGS. 1 and 2, the light pipe 1 is made of a plate-like substance having an upper surface 1a, a lower surface 1b serving as a light exit surface, an incidence side surface 1c, and an end surface 1d opposite to the incidence side surface 1c. Light output means A are formed in the upper surface 1a.

Any plate-like substance may be used if the plate-like substance at least has the upper surface 1a facing the observer's side, the lower surface 1b opposite to the upper surface 1a, and side surfaces between the upper and lower surfaces 1a and 1b (that is, the incidence side surface 1c on which light emitted from a light source is incident, the end surface 1d opposite to the incidence side surface 1c), and a pair of side end surfaces 1e located at opposite ends of the incidence side surface 1c as shown in FIGS. 1 and 2. Alternatively, two or more of the side surfaces between the upper and lower surfaces may be provided as incidence side surfaces. There is no particular limitation in the shape of each of the surfaces. Particularly the incidence side surface may be shaped suitably in accordance with characteristic such as the mode of the light source. The other side surfaces may be likewise shaped suitably.

In order to attach the light pipe to a liquid-crystal display panel easily and produce the light pipe easily, it is preferable that the upper and lower surfaces of the light pipe are substantially flat. When the upper and lower surfaces need to be curved, it is preferable that the shape of each of the upper and lower surfaces does not change suddenly to avoid disorder of an image transmitted through the light pipe. Further, the plate-like substance may be provided as a uniform-thickness plate as shown in FIG. 1 or may be shaped like a wedge having a thickness tapered from the incidence side surface 1c toward the opposite side surface 1d as shown in FIG. 2. The former shape is superior in easiness of attachment. The later wedge shape is superior in light output efficiency because light incident on the incidence side surface can be made incident efficiently on the light output means which are formed in the upper surface and which reach the end surface opposite to the incidence side surface. In addition, reduction in thickness of the opposite end surface is favorable for reduction in weight of the light pipe.

In the case where the fine grooves constituting the light output means provided in the upper surface are large in size, the light output means are apt to become visually conspicuous. As a result, a display image is disordered, so that display quality of the LCD deteriorates remarkably. Moreover, the density of the light output means as the number of fine grooves arranged per unit area of the upper surface of the light pipe is reduced, so that illumination for pixels is apt to become uneven. Accordingly, sparse light emission is apt to make respective emission points visually conspicuous, so that visibility of the display image deteriorates greatly. Increase in density of the light output means, that is, increase in number of fine grooves arranged in the upper surface is effective as a measure to prevent this problem. On this occasion, it is preferable that the size of each of the fine grooves is reduced. Particularly when the area of arrangement of the light output means is limited, reduction in size of each of the fine grooves is effective as a measure to ensure uniformity of light emission.

Figure 3:
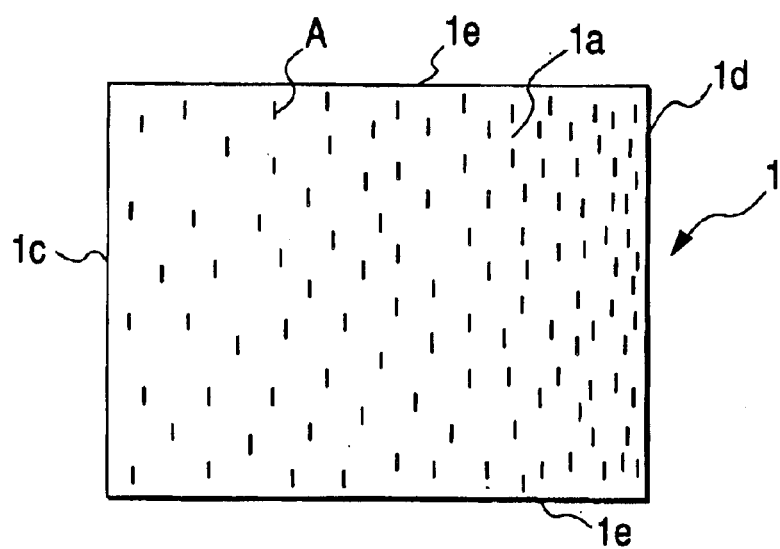
FIG. 3 is an explanatory plan view of an example of arrangement of light output means.
Figure 4:
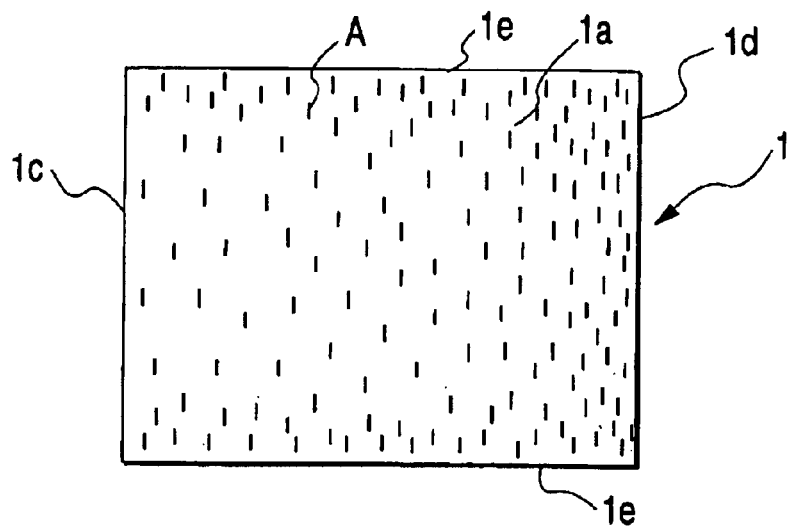
FIG. 4 is an explanatory plan view of another example of arrangement of the light output means.

Accordingly, in order to make the light output means hardly visually recognized by the observer and in order to improve quality of the display image of the LCD through the light pipe, the light output means are constituted by fine grooves A which are arranged discontinuously and each of which has a length not larger than 250 µm, especially not larger than 150 µm, further especially not larger than 100 µm, and a depth not larger than 50 µm, especially not larger than 20 µm, further especially not larger than 15 µm so that the depth is not larger than ⅕ as large as the length, as shown in FIGS. 3 and 4. There is no particular limitation in the lower-limit size of each of the fine grooves. However, if the groove size is too fine, a phenomenon of diffraction of light becomes so dominant that reflection or total reflection can hardly occur. Moreover, the density of the light output means, that is, the number of the fine grooves arranged therein is so large that production efficiency is lowered. It is preferable from this point of view that each of the fine grooves has a length not smaller than 10 µm and a depth not smaller than 2 µm.

In addition, when the depth of each of the fine grooves is selected to be not larger than ⅕ as large as the length thereof, transmitted light can be reflected on the optical path changing slopes so effectively that light incident on the side surface can exit from the lower surface efficiently. If the depth of each of the fine grooves is larger than the length thereof, that is, if the length of each of the fine grooves is shorter than the depth thereof, the probability that the transmitted light will be made incident on the optical path changing slopes is reduced and the probability that the transmitted light will be made incident on respective steep slopes of the fine grooves is increased. As a result, the percentage of scattered light in the transmitted light becomes so high that light-utilizing efficiency is lowered. From the point of view of the efficiency, the depth of each of the fine grooves is preferably selected to be not larger than ⅛, especially not larger than 1/10 as large as the length thereof. Incidentally, the length of each of the fine grooves is based on a direction of the incidence side surface whereas the depth thereof is based on a distance by which the groove falls in the upper surface.

On the other hand, in order to prevent the light output means from becoming visually conspicuous because of regularity formed by the set of fine grooves and in order to prevent moiré from being caused by interference of the fine grooves with pixels, it is preferable that the discontinuous arrangement of the fine grooves is random as shown in FIGS. 3 and 4. If the fine grooves are arranged regularly, moiré is caused by the interference of the regularly arranged fine grooves with the regularly arranged pixels to thereby remarkably reduce visibility of the display light of the liquid-crystal display panel. Arrangement of the fine grooves at random to eliminate the regularity of arrangement permits prevention of occurrence of moiré.

From the point of view of making exit light uniform on the whole lower surface to illuminate the liquid-crystal display panel evenly, it is preferable that the fine grooves A are arranged more densely as they go farther from the incidence side surface $1c$ as shown in FIG. 3 in consideration of reduction in intensity of the transmitted light accompanying transmission and exit of light. In this arrangement, the intensity of exit light can be prevented from being made uneven due to attenuation in intensity of transmitted light accompanying transmission and exit of light. Further, in the case where the quantity of transmitted light on each side end surface side of the incidence side surface is smaller than that on the center portion of the incidence side surface, it is preferable that the fine grooves A are arranged more densely on the side end surface $1e$ side of the incidence side surface $1c$ than those arranged on the center portion of the incidence side surface $1c$ as shown in FIG. 4, from the point of view of making exit light uniform on the whole lower surface to illuminate the liquid-crystal display panel evenly. Incidentally, transmitted light in the neighborhood of the opposite side end surfaces of the light pipe may be often weaker and darker than that in the center portion of the light pipe because of the length of the light source. In this case, as the fine grooves come near to the opposite side end surfaces, they may be arranged more densely to attain uniformity of intensity of exit light. Incidentally, FIG. 4 shows the case where this arrangement style is used in combination with another arrangement style in which the fine grooves are arranged more densely as they go farther from the incidence side surface.

Each of the fine grooves faces the incidence side surface $1c$ as shown in FIGS. 1 and 2. Each of the fine grooves has an optical path changing slope A1, and a steep slope A2. The optical path changing slope A1 is inclined to the lower surface $1b$ at an angle $\theta1$ of 35 to 48 degrees whereas the steep slope A2 facing the optical path changing slope A1 is inclined to the lower surface at an angle $\theta2$ of not smaller than 60 degrees. In such a manner, light incident on the incidence side surface and transmitted through the light pipe is reflected through the optical path changing slopes A1 so that the reflected light can exit from the lower surface with good vertical directivity.

That is, transmitted light which exhibits the highest intensity when a linear light source such as a cold-cathode tube is disposed on the incidence side surface fronts toward a direction approximately perpendicular to the incidence side surface. When the optical path changing slopes A1 inclined at the aforementioned angle with respect to the vector of the transmitted light are arranged as vertically as possible while facing the incidence side surface, the transmitted light can be reflected or totally reflected through the optical path changing slopes A1 inclined at the aforementioned angle so that the reflected light can exit effectively from the lower surface in a direction near to a line normal to the lower surface. As a result, light can be made to exit in a direction effective in viewing, so that the light supplied with display information when reflected through the reflection layer of the liquid-crystal display panel is transmitted through the other portions than the light output means in the upper surface of the light pipe to thereby provide display bright and easy to view. From the point of view of the vertical directivity, the preferred inclination angle $\theta1$ of each of the optical path changing slopes is in a range of from 38 to 45 degrees, especially in a range of from 40 to 43 degrees.

As described above, it is generally preferable that the optical path changing slopes are as perpendicular to the incidence side surface as possible. Hence, in the usual case, the fine grooves are preferably formed to be as parallel to the incidence side surface $1c$ as possible, viewed in the longitudinal direction of the fine grooves as shown in FIGS. 3 and 4. There are, however, some cases where arrangement of the fine grooves to be inclined to the incidence side surface in accordance with light-emitting characteristic of the light source may be preferred and superior in efficiency of incidence of light on the optical path changing slopes. Accordingly, the light output means can be arranged at a suitable angle to the incidence side surface, viewed in the longitudinal direction of the light output means.

On the other hand, the steep slopes A2 facing the optical path changing slopes A1 are provided as slopes each inclined at an angle $\theta2$ of not smaller than 60 degrees to the lower surface because it is preferable that other faces than the optical path changing slopes in the light output means exert as little influence on visibility, light transmission and light output as possible. That is, when the steep slopes are provided as slopes facing the optical path changing slopes A1 and inclined at an angle $\theta 2$ of not smaller than 60 degrees to the lower surface, the projected area of the steep slopes on the lower surface can be reduced when viewed in the direction of the line normal to the light pipe (in the viewing direction of the display panel). As a result, when the light pipe is used for a front light unit, the influence on the visibility of the liquid-crystal display panel disposed behind the light pipe can be reduced.

Further, as the angle of each of the steep slopes increases, reflected light decreases advantageously in terms of reflected light of external light through the steep slopes. On this occasion, the reflected light enters the light pipe and is transmitted through the light pipe, so that the influence of the reflected light on the visibility of display light can be reduced advantageously. Incidentally, when, for example, the angle of each of the steep slopes is about 45 degrees or lower, the reflected light of external light returns to the observer's side and disturbs viewing of the display light. Further, when the angle of each of the steep slopes is selected to be large, the apical angle between the slope A1 and the steep slope A2 can be made low in the case where the light output means are constituted by fine grooves each shaped like a triangle in section as shown in FIG. 1. Accordingly, return of the reflected light can be made so little that the light output means can be made more inconspicuous to the observer. From the point of view of suppressing the influence of the reflected light on the visibility, the preferred angle $\theta 2$ of each of the steep slopes is not lower than 75 degrees, especially not lower than 80 degrees. Incidentally, the ideal angle of each of the steep slopes is 90 degrees. In the ideal case, however, there is a tendency that it is difficult to form the light output means, for example, by a method of transferring the shape of a mold.

Figure 5:
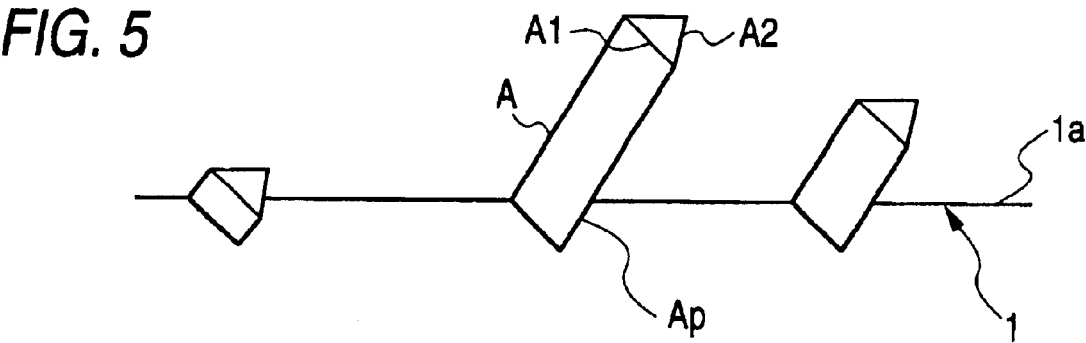
FIG. 5 is a perspective view of the light output means.
Figure 6:
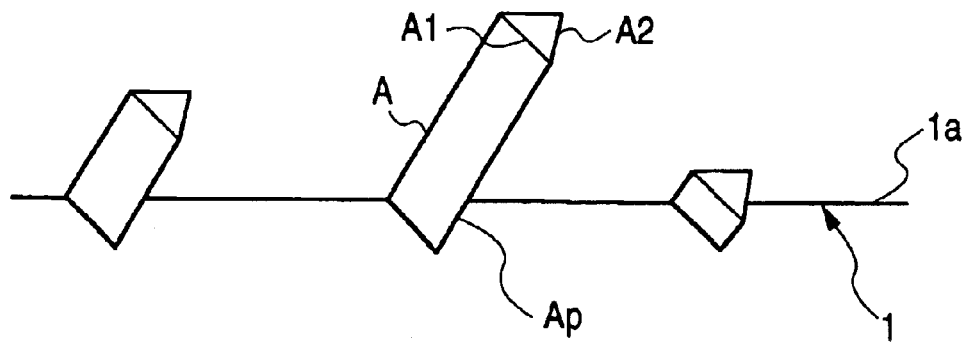
FIG. 6 is a perspective view of another light output means.

The optical path changing slopes and the steep slopes may be constituted by linear surfaces as shown in FIG. 5 or may be constituted by curved or bent surfaces as shown in FIG. 6 if the aforementioned angular condition can be satisfied. Further, when each of the fine grooves A is shaped substantially like a scalene triangle in section as shown in FIGS. 1, 2, 5 and 6, it is preferable that the apex Ap formed between the optical path changing slope A1 and the steep slope A2 has an angle as sharp as possible. When the apex is rounded, it is preferable that the ratio of the radius of the roundness of the apex to the depth of the fine groove is selected to be not larger than 30%, especially not larger than 20%, further especially not larger than 10%. In such a manner, reflection of external light caused by the roundness of the apex can be suppressed to make the fine grooves visually inconspicuous. In addition, scattering of the transmitted light in the inside of the light pipe can be suppressed to improve uniformity and efficiency of exit light.

There is no particular limitation in the shape of side faces of each of the fine grooves. In order to suppress incidence of light on the side faces and reduce the influence of the side faces, it is preferable that each of the side faces is inclined at an angle not lower than 30 degrees, especially not lower than 45 degrees, further especially not lower than 60 degrees with respect to the lower surface. From the point of view of optical characteristic such as efficiency of incidence of transmitted light and mar-proof property, each of the fine grooves is formed as a concave portion depressed in the upper surface as shown in FIG. 1. The sectional form of the fine groove can be formed as a suitable form having a combination of an optical path changing slope and a steep slope as described above. Generally, a groove shaped substantially like a triangle in section is preferred.

It is preferable that the ratio of the area of the light output means constituted by fine grooves to the area of the upper surface of the light pipe is selected to be not larger than $\frac{1}{8}$, from the point of view of reducing the influence of the light output means on light transmitted vertically through the light pipe as much as possible to thereby reduce the influence of the light pipe on the display light of the liquid-crystal display panel when the light pipe is used for a front light system. If the area occupied by the light output means in the upper surface is too large, the quantity of light reflected on the slopes in the light output means is increased so that the display light can hardly exit toward the observer's side when a display image of an LCD is observed through the light pipe in such a front light system. When the area of the light output means is selected to be not larger than $\frac{1}{8}$ as large as the area of the upper surface, a large part of the upper surface can be provided as a portion in which the light output means are not formed. As a result, the display light of the LCD is transmitted efficiently through this portion, so that the problem caused by the area of the light output means can be avoided. The preferred area of the light output means is not larger than $\frac{1}{10}$, especially not larger than $\frac{1}{15}$ as large as the area of the upper surface.

The light pipe can be made of at least one kind of material selected in accordance with the wavelength range of the light source and exhibiting transparency to the wavelength range. Incidentally, examples of the suitable material used in a visible light range include: transparent resins represented by an acrylic resin, a polycarbonate resin, an epoxy resin, a polyester resin and a norbornene resin; and glass. A light pipe made of a material exhibiting no birefringence or little birefringence is used preferably. A light pipe made of a material small in specific gravity is preferred from the point of view of lightweight characteristic.

The light pipe may be formed by a suitable method. Examples of the producing method may include: a method in which a thermoplastic resin is hot-pressed against a mold capable of forming a predetermined shape to thereby transfer the shape to the thermoplastic resin; a method in which a mold capable of forming a predetermined shape is filled with a hot-melted thermoplastic resin or with a resin fluidized by heat or through a solvent; a method in which a polymerizing process is performed after a mold capable of forming a predetermined shape is filled with a liquid resin polymerizable by heat or by radiation rays such as ultraviolet rays, or after the liquid resin is cast in the mold; a method in which a coating layer is obtained by application of the liquid resin onto a mold capable of forming a predetermined shape, and the coating layer of the liquid resin is brought into close contact with a transparent base material such as a resin plate and subjected to a polymerizing process; a method in which a coating layer is obtained by application of the liquid resin onto a soft and transparent base material such as a film, the coating layer is brought into close contact with a mold capable of forming a predetermined shape and subjected to a polymerizing process, and then the polymerized coating layer is brought into close contact with a transparent base material such as a resin plate through an adhesive agent.

Accordingly, the light pipe may be formed as a laminate of parts made of one kind of material or different kinds of materials, such as a laminate obtained by bonding a sheet with light output means onto a light guide portion which plays a roll in transmitting light. That is, the light pipe need not be formed as an integral single layer body made of one kind of material. The thickness of the light pipe can be determined suitably in accordance with the size of the light pipe on the basis of the purpose of use, or in accordance with the size of the light source disposed on the incidence side surface. The thickness of the light pipe generally used for forming a reflective liquid-crystal display device is selected to be not larger than 20 mm, especially in a range of from 0.1 to 10 mm, further especially in a range of from 0.5 to 5 mm in terms of the height of the incidence side surface of the light pipe. The light pipe may contain an anti-reflection layer on its lower surface or a hard coat layer on its upper surface.

Figure 7:
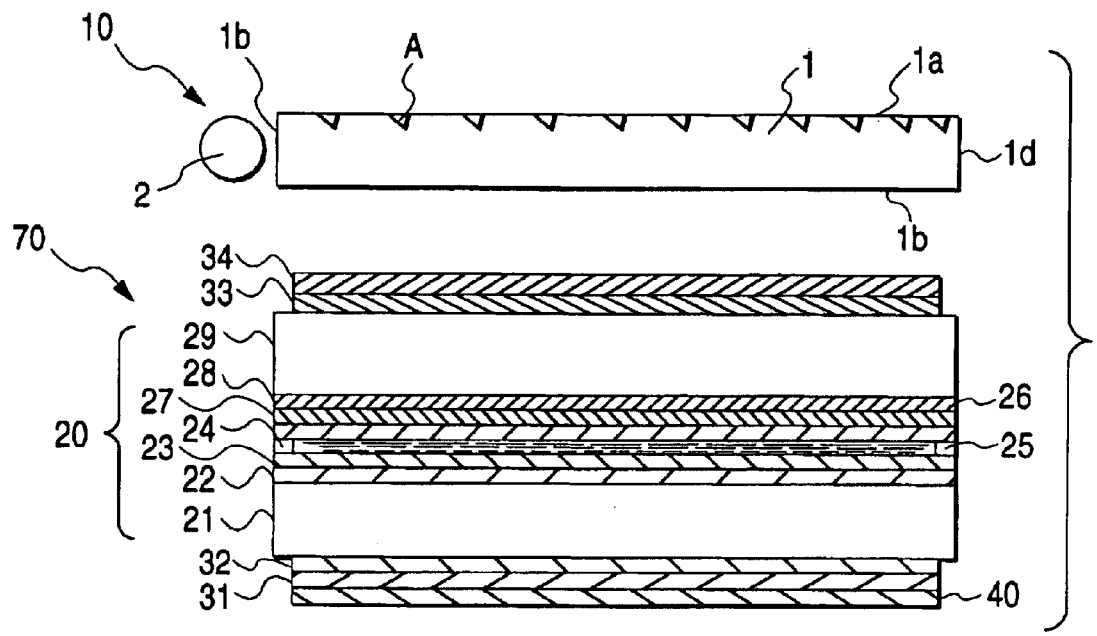
FIG. 7 is an explanatory side view of a planar light source unit and a reflective liquid-crystal display device.
Figure 8:
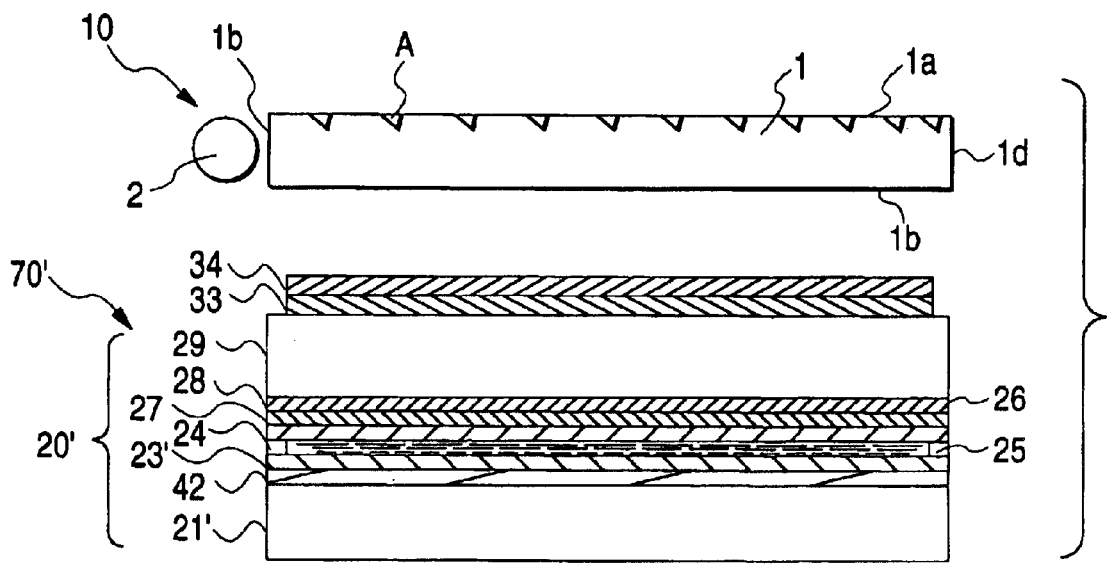
FIG. 8 is an explanatory side view of another reflective liquid-crystal display device.

In the light pipe according to the invention, light incident on the incidence side surface is collimated with high accuracy so that the collimated light exits from the lower surface in a direction superior in perpendicularity and favorable for viewing. Hence, the light pipe can be used for forming various devices, such as a planar light source unit which utilizes light from the light source so efficiently as to be superior in brightness, and a reflective liquid-crystal display device which is bright, easy to view and superior in low electric power consumption. FIGS. 7 and 8 show an example of the planar light source unit 10 and an example of the reflective liquid-crystal display device respectively.

The planar light source unit can be formed in a suitable style having a light pipe. The planar light source unit is generally formed as a unit in which at least one light source 2 is disposed on at least one incidence side surface 1c of the light pipe as shown in FIGS. 7 and 8. Any suitable material may be used as the light source 2. Examples of the material generally used may include: a linear light source such as a (cold or hot) cathode tube; a point light source such as a light-emitting diode; an array of point light sources arranged linearly or planarly; and a light source using a device such as a linear light pipe for converting light from a point light source into light emitted at regular or random intervals to thereby obtain a linear light emission state.

When the planar light source unit is to be formed, a suitable auxiliary unit such as a reflector for surrounding the light source or a light diffusing layer may be combined with the light source unit in accordance with necessity so that the diverging light from the light source is efficiently guided to the incidence side surface of the light pipe. A resin sheet provided with a high-reflectance metal thin film or a sheet of metal foil is generally used as the reflector. When the reflector is bonded to end portions of the light pipe through an adhesive agent for holding the light source, the light output means need not be formed in the adhesive portion.

In order to make brightness uniform by preventing unevenness caused by light and shade, the light diffusing layer may be disposed on the light output surface of the planar light source unit, that is, on the lower surface of the light pipe in advance as occasion demands. The light-diffusing layer can be formed by a suitable method and there is no particular limitation in the method for forming the light-diffusing layer. Examples of the suitable method include: a method in which a transparent resin containing transparent particles dispersed therein is applied and cured; a method in which a transparent resin containing air bubbles dispersed therein is applied and cured; a method in which a surface is swollen through a solvent to thereby generate craze; a method in which a transparent resin layer having a random tongued and grooved surface is formed; and a method in which a diffusing sheet formed in accordance with the above description is used.

On the other hand, the reflective liquid-crystal display device can be formed as a front light type device in which a reflective liquid-crystal display panel 70 or 70' having a reflection layer is formed on the lower surface 1b side of the light pipe 1 itself or in the planar light source unit 10 as shown in FIG. 7 or 8. Incidentally, FIG. 7 shows a reflective liquid-crystal display device in which a reflective layer 40 is provided outside a back-side substrate 21 in a liquid-crystal cell 20, and FIG. 8 shows a reflective liquid-crystal display device in which a reflection layer serving also as an electrode 42 is formed inside a back-side substrate 21' in a liquid-crystal cell 20'.

Generally, the reflective liquid-crystal display device is formed by use of a combination of a liquid-crystal display panel and a front light system. The liquid-crystal display panel can be obtained by suitably assembling constituent parts such as a liquid-crystal cell provided with an electrode and functioning as a liquid-crystal shutter, a driver attached to the liquid-crystal cell, a reflection layer and, if necessary, a polarizer and a compensating phase retarder. The reflective liquid-crystal display device according to the invention is not particularly limited except that the device uses the light pipe or the planar light source unit. That is, the reflective liquid-crystal display device can be formed by a method according to the related art as shown in FIG. 7 or 8.

Incidentally, the liquid-crystal cell 20 in FIG. 7 is composed of a back-side transparent substrate 21 provided with a transparent electrode 22 and a rubbing film 23 formed successively on the inner side of the back-side transparent substrate 21, a visual-side transparent substrate 29 provided with a color filter 26, a transparent electrode 28 and a rubbing film 27 formed successively on the inner side of the visual-side transparent substrate 29, and liquid crystal 24 filled between the back-side and visual-side transparent substrates 21 and 29 and sealed with a sealing member 25. Moreover, a polarizer 34 is provided on the outer side of the visual-side transparent substrate 29 through a phase retarder 33, and a polarizer 31 is provided on the outer side of the back-side transparent substrate 21 through a phase retarder 32. In addition, a reflection layer 40 is provided on the outer side of the polarizer 31. In this manner, the reflective liquid-crystal display panel 70 is formed.

On the other hand, the liquid-crystal cell 20' in FIG. 8 is composed of a back-side substrate 21' provided with an electrode 42 serving as a reflection layer and a rubbing film 23' formed successively on the inner side of the back-side substrate 21', a visual-side transparent substrate 29 provided with a color filter 26, a transparent electrode 28 and a rubbing film 27 formed successively on the inner side of the visual-side transparent substrate 29, and liquid crystal 24 filled between the back-side and visual-side substrates 21' and 29 and sealed in the same manner as described above. Moreover, a polarizer 34 is disposed on the outer side of the visual-side transparent substrate 29 in the liquid-crystal cell 20' through a phase retarder 33. In this manner, the reflective liquid-crystal display panel 70' is formed.

Any suitable liquid-crystal cell can be used as the liquid-crystal cell used for forming the liquid-crystal display panel without any particularly limitation. Examples of the suitable liquid-crystal cell on the basis of the aligning format of liquid crystal include: a twisted or non-twisted liquid-crystal cell such as a TN liquid-crystal cell, an STN liquid-crystal cell, a vertically aligned cell, an HAN cell or an OCB cell; a guest-host liquid-crystal cell; and a ferroelectric liquid-crystal cell. In addition, the system for driving the liquid crystal is not particularly limited. For example, there may be used a suitable drive system such as an active matrix system or a passive matrix system.

The reflection layer 40 or a reflection layer 42 is essential to the reflective liquid-crystal display device. As for the position of arrangement of the reflection layer 40 or 42 as described above, the reflection layer may be disposed outside the liquid-crystal cell 20 as shown in FIG. 7 or may be disposed inside the liquid-crystal cell 20' as shown in FIG. 8. Any suitable reflection layer formed in accordance with the related art can be used as the reflection layer. Examples of the reflection layer include: a coating layer containing powder of a high-reflectance metal such as aluminum, silver, gold, copper or chromium dispersed in a binder resin; a layer of a metal thin film deposited by a vapor deposition method; a reflection sheet having the coating or deposited layer supported by a base material; and a sheet of metal foil. Incidentally, when the reflection layer is provided inside the liquid-crystal cell, the reflection layer is, for example, made of a transparent electrode forming material in accordance with the related art so as to serve also as a transparent conductive film.

On the other hand, any suitable plate can be used as the polarizer if necessary. From the point of view of obtaining good-contrast-ratio display due to incidence of highly linearly polarized light, a plate with a high degree of polarization such as an absorption type linear polarizer of iodine or dye may be used preferably. Further, if occasion demands, the phase retarder may be disposed between the visual-side polarizer and the liquid-crystal cell and/or between the back-side polarizer and the liquid-crystal cell for the purpose of compensating birefringence of the liquid crystal and therefore improving visibility as shown in FIGS. 7 and 8. A suitable plate in accordance with the wavelength range may be used as the phase retarder. The phase retarder may be formed as one retardation layer or as a superposed layer of two or more retardation layers.

Viewing by the reflective liquid-crystal display device shown in FIG. 7 is performed as follows. In an illumination mode in which the light source 2 of the planar light source unit 10 is turned on, light made to exit from the lower surface 1b of the light pipe 1 passes through the polarizer 34 and the liquid-crystal cell 20 and is reflected through the reflection layer 40. Then, the reflected light passes through the liquid-crystal cell and the polarizer in reverse and reaches the light pipe 1. Thus, a display image transmitted through the portion other than the light output means A in the upper surface 1a is viewed. On the other hand, in an external light mode in which the light source 2 is turned off, light incident on the portion other than the light output means A in the upper surface la of the light pipe 1 is transmitted and passes in a course reverse to that in the illumination mode, and then reaches the light pipe 1. Thus, a display image transmitted through the portion other than the light exit portions A in the upper surface 1a is viewed. On the other hand, in the case of the reflective liquid-crystal display device shown in FIG. 8, viewing both in an illumination mode and in an external light mode can be performed in the same manner as described above except that the light is reflected through the reflection layer 42 functioning also as an electrode in place of the reflection layer 40 and then travels in reverse. Incidentally, when the illumination-external light double mode is used as described above, the reflective liquid-crystal display device is formed so that the light source can be switched on/off.

In the invention, optical elements or parts such as a light pipe, a liquid-crystal cell and a polarizer for forming the planar light source unit or the liquid-crystal display device may be wholly or partially integrally laminated and fixed to one another or may be disposed so as to be easily separable. From the point of view of suppressing interfacial reflection to prevent lowering of contrast, it is preferable that such optical elements or parts are fixed to one another. It is preferable that at least the lower surface of the light pipe and the upper surface of the liquid-crystal display panel are adhesively fixed to each other. A suitable transparent adhesive agent such as a tackifier can be used for the fixing/adhering process. Transparent particles may be contained in the transparent adhesive layer so that the transparent adhesive layer can be provided as an adhesive layer exhibiting a light-diffusing function.

REFERENCE EXAMPLE 1

A chromium mask having apertures each measuring 100 $\mu$m long by 10 $\mu$m wide was formed in a 35 mm×25 mm oblong region on a glass substrate so that the short sides of the rectangle were parallel with the length of each aperture. Incidentally, the apertures were arranged gradually more densely as the apertures went from one short side of the rectangle to the other short side thereof. Accordingly, the apertures were arranged at random so that the density of the apertures was increased continuously along the direction of the long side of the rectangle (FIG. 3). Further, the area occupied by the apertures in total was selected to be not larger than 1/10 as large as the area of the rectangle.

On the other hand, polyimide varnish was applied on a cleaned glass plate by a spin coater, pre-baked at 100° C. for 30 minutes, and sintered at 350° C. for 4 hours. Thus, a polyimde coating film 10 $\mu$m thick was formed. After that, a chromium film 0.1 $\mu$m thick was formed on the polyimde coating film by a sputtering process, a copper film 0.5 $\mu$m thick was then formed thereon, and finally, a positive resist 5 $\mu$m thick was formed on the surface of the resulting film by spin coating. Thus, a sample plate was produced.

In a state that the positive resist of the sample plate was disposed in close contact with the chromium mask, the positive resist was exposed to ultraviolet rays and developed. After the development, the copper film and the chromium film were removed by etching. Thus, a sample plate having the polyimde coating film exposed at the apertures was obtained. The sample plate was disposed as follows. That is, the short side of the sample plate in which the density of the apertures was sparse was located perpendicularly to the advancing direction of the beam while the long side of the sample plate was inclined at an angle of 43 degrees to the beam. The sample plate was irradiated with parallel excimer laser light while scanned several times, so that the polyimide coating film in the apertures was partially removed by ablation. Then, the copper film and the chromium film in the sample plate were removed by etching. Then, a silver thin film was deposited on the sample plate by vacuum vapor deposition and nickel-electrocasting was performed. The plate was cut into a predetermined shape to thereby obtain a mold A.

REFERENCE EXAMPLE 2

A mold B was obtained in the same manner as in Reference Example 1 except that the sample plate (FIG. 4) had apertures arranged at random so that the density of the apertures arranged in the oblong region was increased continuously in the direction of the long sides while the density of the apertures in the long sides was made higher than that in the center portion.

REFERENCE EXAMPLE 3

A mold C was obtained as follows. A surface of an oblong brass plate was cut by a diamond tool in a position far by 2.5 mm from the incidence side surface. Thus, the mold C having striped light output means constituted by fine grooves arranged at intervals of 210 μm and each shaped like a scalene triangle in section was obtained. The cutting direction was parallel with the longitudinal direction of the brass plate. Each of the light output means was constituted by a combination of an optical path changing slope and a gentle slope. The optical path changing slope was 20 μm wide, was inclined at an angle of 42 degrees, and faced the incidence side surface side. The gentle slope was 190 μm wide. The area occupied by the optical path changing slopes was 1/10.5 as large as the area of the upper surface.

REFERENCE EXAMPLE 4

A mold D was obtained to have, as a light output means-forming surface, a non-glossy surface formed by processing a surface of an oblong brass plate by sandblasting.

REFERENCE EXAMPLE 5

A mold E was obtained in the same manner as in Reference Example 1 except that the sample plate was disposed in a manner such that the short side sparse in density of the apertures was perpendicular to the beam, and the sample plate was then irradiated with parallel excimer laser light while scanned several times, so that the polyimide coating film was partially removed by ablation. Accordingly, the mold E did not have a surface in which optical path changing slopes each having a predetermined angle could not be formed.

EXAMPLE 1

An ultraviolet-curable acrylic resin was applied onto the mold A obtained in Reference Example 1. An acrylic plate which was 1.2 mm thick, 40 mm wide and 30 mm long and which had end surfaces polished was quietly put on the acrylic resin. After the acrylic resin and the acrylic plate were made to adhere closely to each other by a rubber roller so that surplus resin and air bubbles were extruded, the acrylic resin was irradiated with ultraviolet rays by a metal halide lamp so as to be cured. Then, the cured acrylic resin was separated from the mold A. Thus, there was obtained a light pipe including the cured layer of acrylic resin to which the negative shape of the mold A was transferred and which was disposed on the acrylic plate. Incidentally, the refractive index of the acrylic plate was 1.495 whereas the refractive index of the cured layer was 1.512.

EXAMPLE 2

A light pipe was obtained in the same manner as in Example 1 except that the mold A was replaced by the mold B obtained in Reference Example 2.

COMPARATIVE EXAMPLE 1

A light pipe was obtained in the same manner as in Example 1 except that the mold A was replaced by the mold C obtained in Reference Example 3.

COMPARATIVE EXAMPLE 2

A light pipe was obtained in the same manner as in Example 1 except that the mold A was replaced by the mold D obtained in Reference Example 4.

COMPARATIVE EXAMPLE 3

A light pipe was obtained in the same manner as in Example 1 except that the mold A was replaced by the mold E obtained in Reference Example 5.

Evaluation Test

The light pipe obtained in each of Examples 1 and 2 and Comparative Examples 1 to 3 was used so that its light output means were located on the visual side. A cold-cathode tube was disposed on the incidence side surface of the light pipe. Thus, a planar light source unit was formed. A normally white reflective liquid-crystal display panel was disposed on the back side of the light pipe. Thus, an LCD was formed. The LCD was observed in a dark room from the frontal direction while the cold-cathode tube was turned on in the condition that the liquid-crystal cell was supplied with no voltage.

As a result, in Examples 1 and 2, light was emitted evenly and the fine grooves were substantially inconspicuous. Particularly, in Example 2, uniformity of emission was high in a direction parallel with the light source. In Comparative Example 1, however, dark lines in parallel with the incidence side surface were viewed due to the prism structure of the light pipe and the display was not easy to view. Moreover, when the visual axis was swung, the dark lines became linearly emitted lines to thereby make it very difficult to view the display. On the other hand, in Comparative Examples 2 and 3, light was little emitted and display was very dark.

Next, characters were displayed on the LCD and observed in a bright room while the light source was turned off. As a result, in Examples 1 and 2 and Comparative Example 3, the fine grooves were substantially inconspicuous, so that the characters were bright and easy to read without any moiré generated whereas, in Comparative Example 1, the characters were difficult to read because of moiré generated. Particularly, there was a tendency that the lines were viewed as if lines were connected to one another in a transverse direction, so that the display quality was lowered. Moreover, in Comparative Example 2, the total contrast was lowered so that particularly a small figure could not be identified.

It is apparent from the description that the use of the light pipe according to the invention permits the formation of a planar light source unit which is bright and excellent in uniformity of light emission when a light source is disposed on an incidence side surface of the light pipe, and permits the formation of a front light type reflective liquid-crystal display device which is free from moiré, bright and easy to view.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A light pipe comprising a plate-like substance having an upper surface, a lower surface opposite to said upper surface, an incidence side surface, and an end surface opposite to said incidence side surface, said plate-like substance including light output means formed in said upper surface so that light incident on said incidence side surface is made to exit from said lower surface through said light output means, said light output means being constituted by fine grooves arranged discontinuously so as to face said incidence side surface, each of said fine grooves having a length of not larger than 250 μm and a depth of not larger than 50 μm and not larger than 1/5 as large as said length, each of said fine grooves forming an apex angle, and each of said fine grooves being constituted by a combination of an optical path changing slope inclined to said lower surface at an angle in a range of from 35 to 48 degrees and a steep slope facing said optical path changing slope and inclined to said lower surface at an angle of not lower than 60 degrees.

2. A light pipe according to claim 1, wherein an area occupied by said light output means is not larger than ⅛ as large as that occupied by said upper surface.

3. A light pipe according to claim 1, wherein said angle of inclination of each of said optical path changing slopes to said lower surface ranges from 38 to 45 degrees.

4. A light pipe according to claim 1, wherein said discontinuous arrangement of said fine grooves is random.

5. A light pipe according to claim 1, wherein said fine grooves are arranged more densely as said fine grooves go farther from said incidence side surface.

6. A light pipe according to claim 1, wherein said fine grooves are arranged more densely as said fine grooves go closer to each side end surface of said incidence side surface.

7. A planar light source unit comprising a light pipe according to claim 1.

8. A planar light source unit according to claim 7, further comprising a light source disposed on an incidence side surface of said light pipe.

9. A planar light source unit according to claim 8, wherein said light source is a linear light source.

10. A reflective liquid-crystal display device comprising a light pipe according to claim 1, and a reflective liquid-crystal display panel disposed on lower surface side of said light pipe.

11. A reflective liquid-crystal display device comprising a planar light source unit according to claim 7, and a reflective liquid-crystal display panel disposed in a lower surface side of a light pipe in said planar light source unit.

\* \* \* \* \*